United States Patent [19]

Ross et al.

[11] Patent Number: 4,606,263

[45] Date of Patent: Aug. 19, 1986

[54] APPARATUS FOR PEELING PINEAPPLES

[75] Inventors: Edward E. Ross, San Rafael; Jurgen H. Strasser, Lafayette, both of Calif.

[73] Assignee: Del Monte Corporation, San Francisco, Calif.

[21] Appl. No.: 742,455

[22] Filed: Jun. 7, 1985

[51] Int. Cl.[4] .......................... A23N 4/20; A23N 7/00; A23N 7/08
[52] U.S. Cl. ........................................ 99/542; 99/544
[58] Field of Search .................. 99/539, 505, 541, 515, 99/542–545, 547, 584, 588, 593, 644

[56] References Cited

U.S. PATENT DOCUMENTS

| | | |
|---|---|---|
| 1,060,750 | 5/1913 | Ginaca . |
| 3,540,503 | 11/1970 | McNair . |
| 4,246,700 | 1/1981 | Coulon et al. .................. 99/545 X |
| 4,441,413 | 4/1984 | Mori ........................................ 99/542 |
| 4,490,912 | 1/1985 | Hirano ............................. 99/545 X |
| 4,546,545 | 10/1985 | Hirano ............................. 99/543 X |

FOREIGN PATENT DOCUMENTS

| | | | |
|---|---|---|---|
| 260257 | 7/1949 | Fed. Rep. of Germany | ........ 99/545 |
| 764717 | 3/1957 | United Kingdom | .................. 99/545 |

Primary Examiner—Timothy F. Simone
Attorney, Agent, or Firm—Herbert J. Bluhm

[57] ABSTRACT

Apparatus for removing the peel from a pineapple comprises a cylindrical body provided with a toothed cutting edge designed to cut through a pineapple and fixed guide means telescopically positioned within the cylindrical body and adapted to direct the toothed cutting edge of the cylindrical body towards a pineapple that is placed on a cutting pad positioned in opposing relationship to the toothed cutting edge. The apparatus is optionally provided with a core tube slidably disposed in a passageway extending through the guide means and designed to cut through the central core of a pineapple placed on the cutting pad. The apparatus is also provided with means for simultaneously or separately moving the cylindrical body and the core tube towards the pineapple and the cutting pad.

19 Claims, 10 Drawing Figures

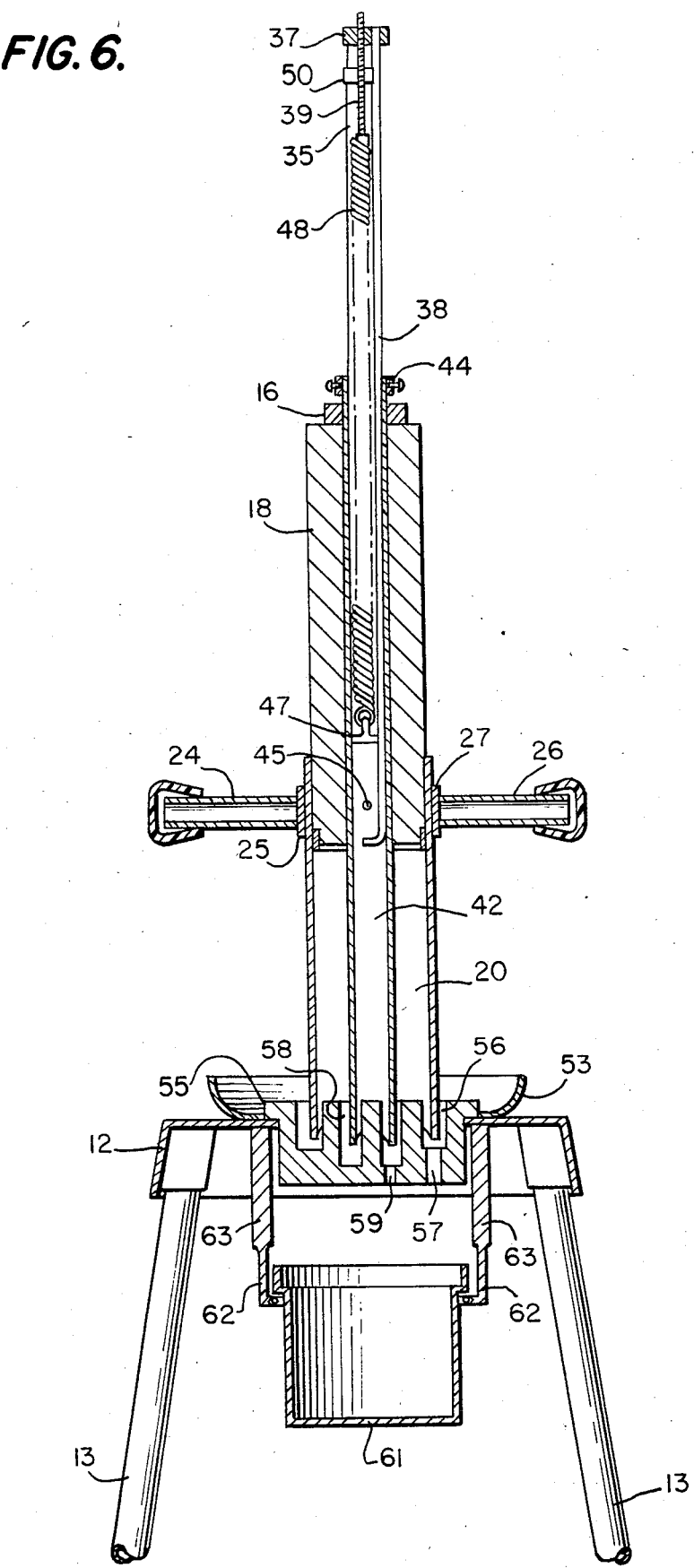

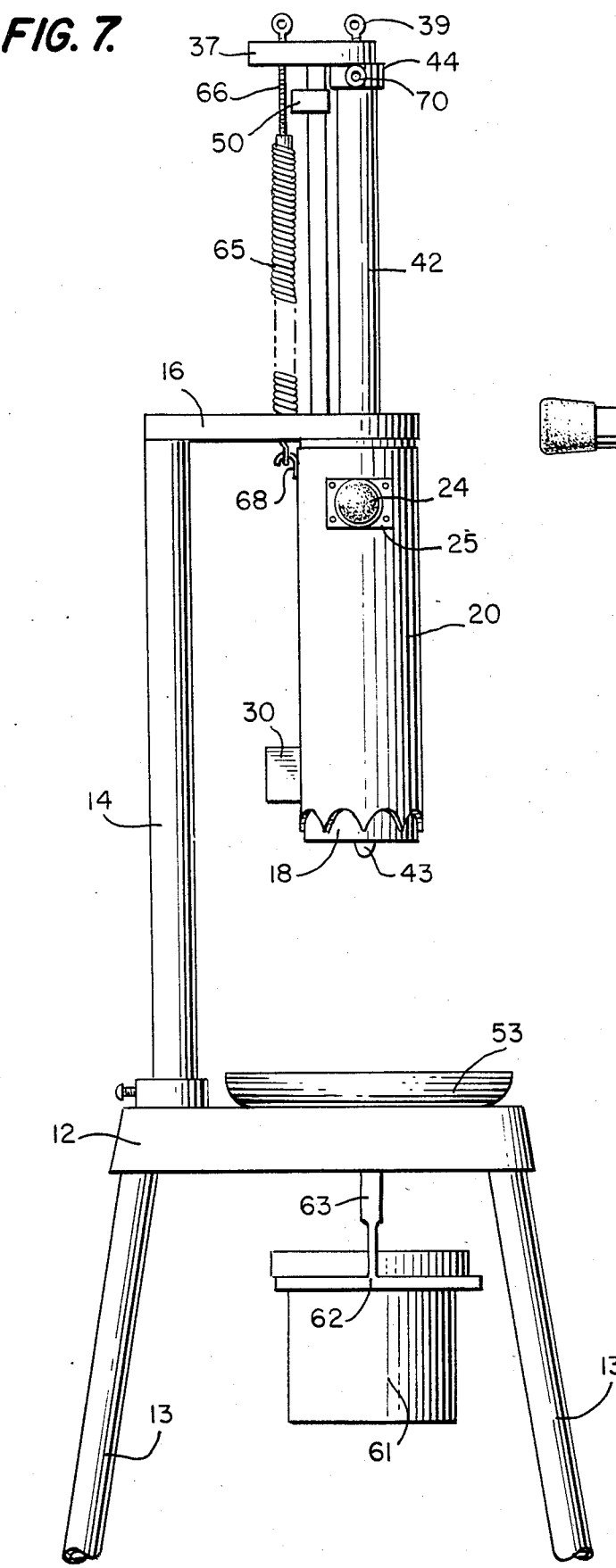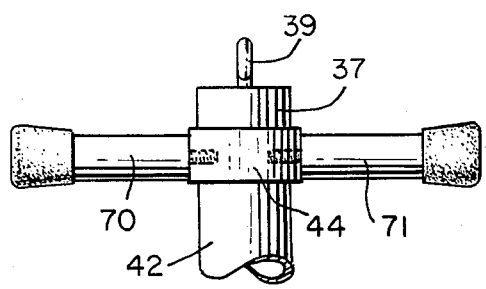

APPARATUS FOR PEELING PINEAPPLES

TECHNICAL FIELD

This invention relates to apparatus for peeling and coring fresh pineapples.

BACKGROUND OF THE INVENTION

The universal appeal of fresh fruits is readily confirmed by the large consumer demand that exists for such products. The most popular fruits are those which can be prepared for consumption with little effort on the part of the consumer. The popularity of pineapples in the fresh fruit market has been somewhat limited, therefore, due to the difficulties consumers have in removing the thick, hard shells from pineapples and separating the edible flesh from the cores of the pineapples.

Devices for peeling and/or coring pineapples and intended for use by the consumer have been described in the art. For example, U.S. Pat. Nos. 3,540,503 and 4,490,912 describe hand-held devices for peeling and coring pineapples. Somewhat more elaborate apparatus for performing this task is disclosed in U.S. Pat. No. 4,441,413. The devices disclosed in these patents, however, are not entirely satisfactory for various reasons relating to operational aspects thereof. The operational aspects are particularly important because such devices are generally employed by inexperienced users.

SUMMARY OF THE INVENTION

The present invention provides a pineapple peeling and coring apparatus that is capable of producing satisfactory results even when used by inexperienced operators. Thus, the apparatus is suitable for use in food supermarkets or other locations where fresh pineapples are sold as a convenience to shoppers who wish to purchase pineapples but who wish to avoid the time-consuming operation of peeling and coring the pineapples using kitchen utensils not specifically designed for that task.

The apparatus of this invention comprises (a) an elongated, substantially cylindrical body provided with a tooth cutting edge on one end of the cylindrical body that is designed to cut through a pineapple, (b) elongated guide means telescopically positioned within the cylindrical body and provided with a first support means for maintaining the guide means in a substantially fixed position without interfering with telescopic movement of the cylindrical body, (c) a cutting pad positioned in opposing relationship to and spaced a sufficient distance from the tooth cutting edge of the cylindrical body to permit a pineapple to be interposed between the cutting pad and the cylindrical body, and (d) means for moving the cylindrical body towards the cutting pad with sufficient force to enable the toothed cutting edge to engage and to pass through a pineapple interposed between the cutting pad and the cylindrical body.

In a preferred embodiment this invention also provides for removal of the pineapple core in a separate manipulative step or simultaneously with removal of the peel. In this embodiment the elongated guide means is provided with a passageway extending along the longitudinal axis of the guide means and designed to accommodate a substantially cylindrical core tube slidably positioned therein. The core tube is provided with a pointed cutting tip that is positioned in the passageway in the guide means in opposing relationship to the cutting pad. The core tube is also elastically or resiliently attached to a second support means and is provided with means for moving the core tube towards said cutting pad with sufficient force to enable the pointed cutting tip to engage and to pass through a pineapple interposed between the cutting pad and the core tube.

DRAWINGS

FIG. 6 is a cross-section view taken along a plane passing through line VI—VI of FIG. 5.

FIG. 7 is an elevation view similar to that of FIG. 3 but showing another embodiment of the invention.

FIG. 8 is an elevation view of a portion of the apparatus shown in FIG. 7 as seen from the front of the apparatus.

DETAILED DESCRIPTION OF THE INVENTION

Figure 1:
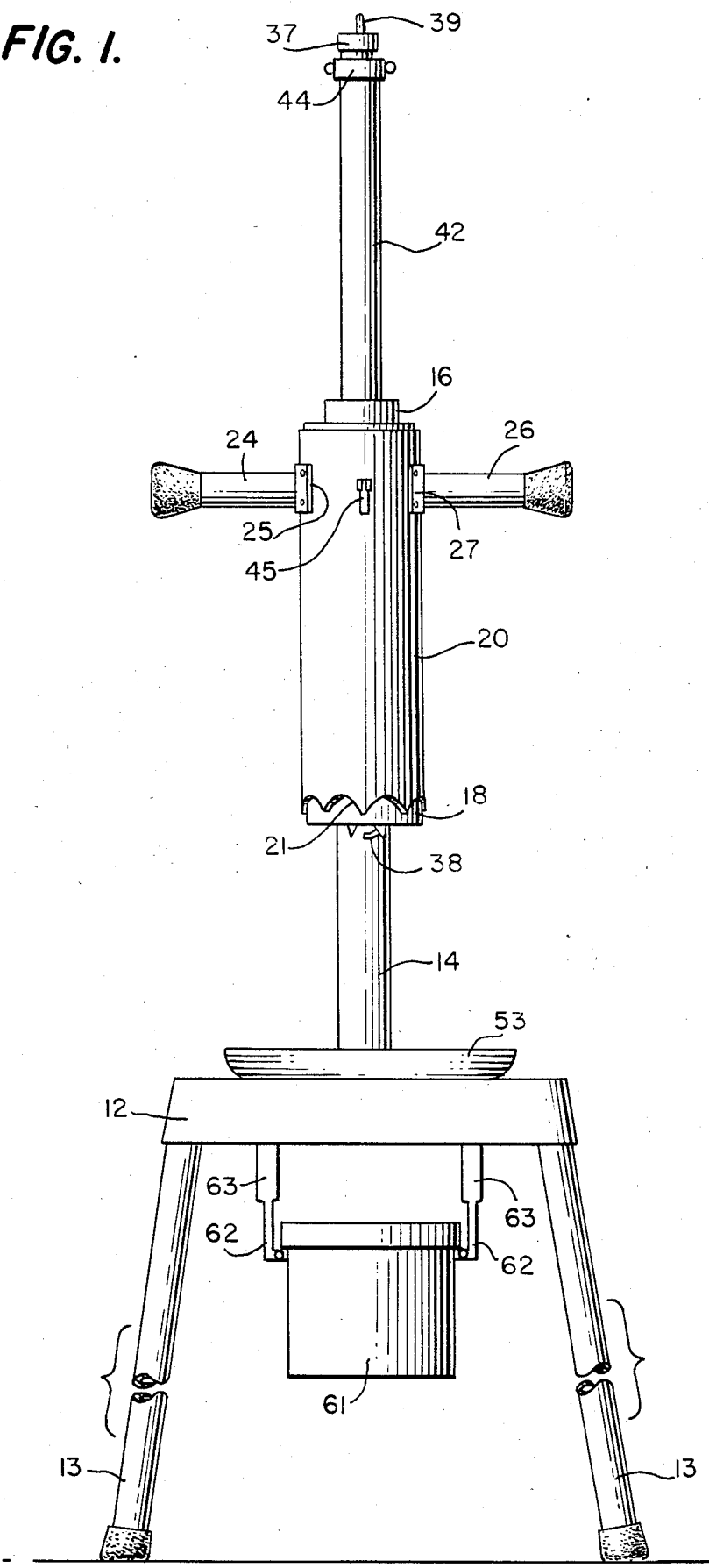
FIG. 1 is an elevation view of the front of a preferred embodiment of this invention.
Figure 2:
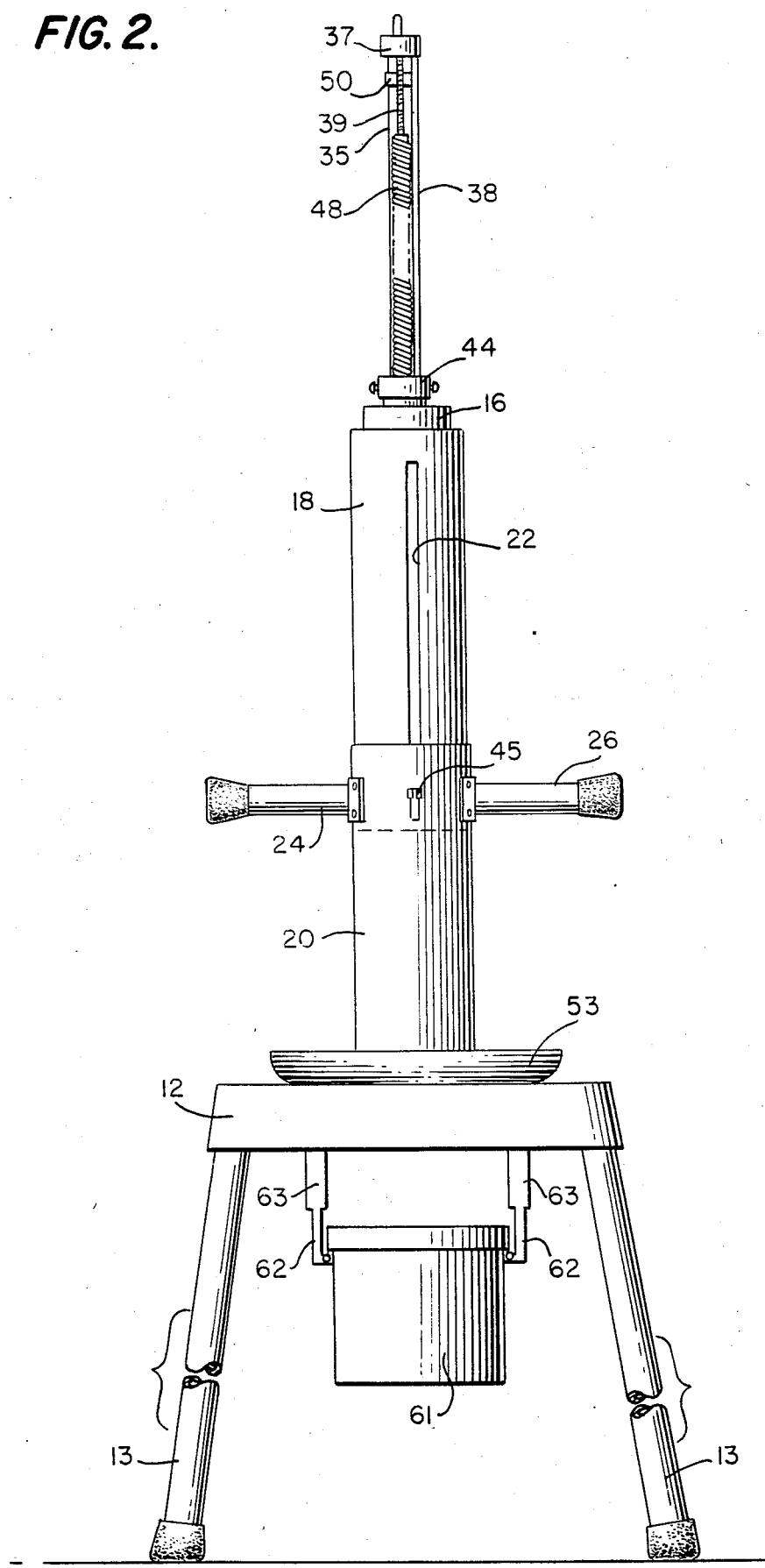
FIG. 2 is a view similar to that of FIG. 1 but showing the cylindrical cutting member and core tube in the "engaged" position.
Figure 3:
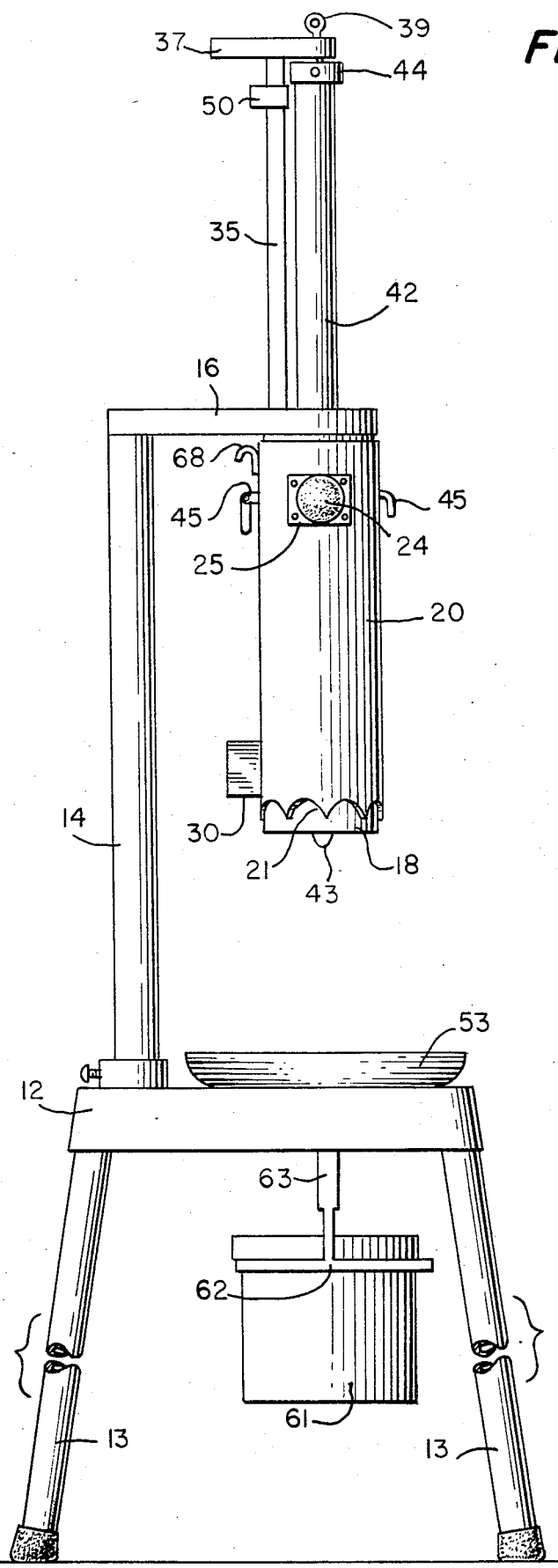
FIG. 3 is an elevation view of the side of the apparatus that is shown in FIG. 1.
Figure 4:
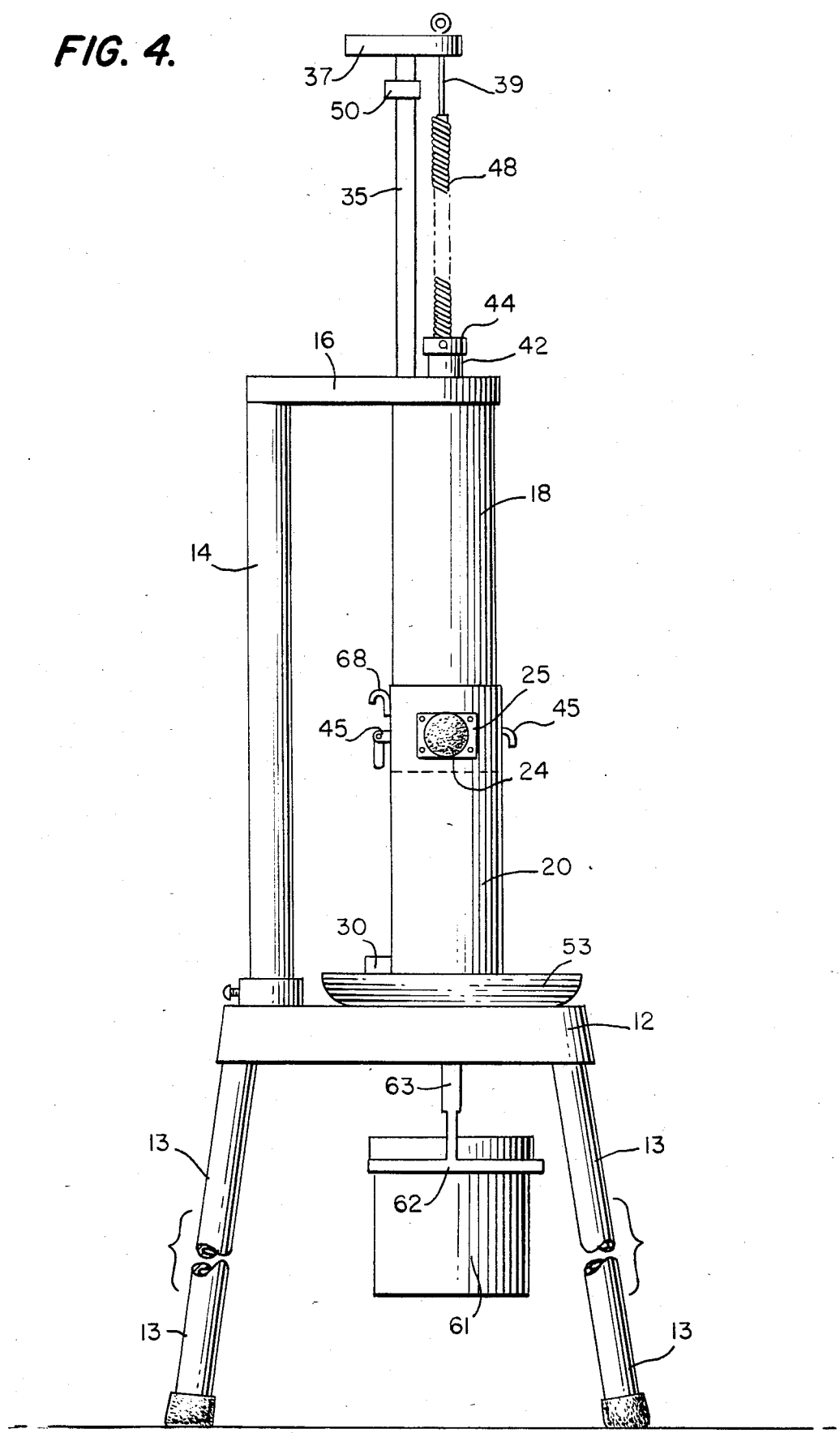
FIG. 4 is a view similar to that of FIG. 3 but showing the cylindrical cutting member and core tube in the "engaged" position.
Figure 5:
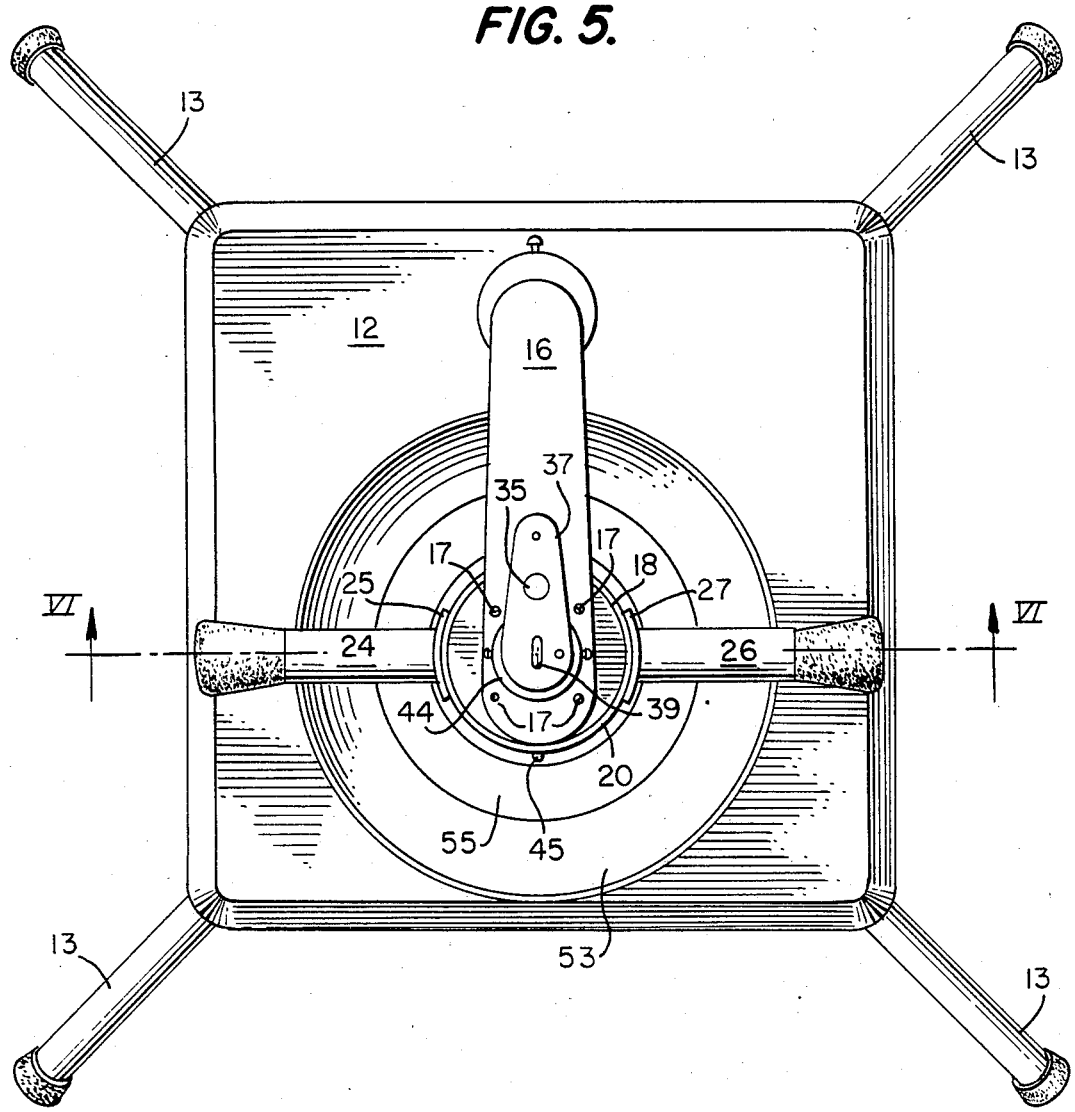
FIG. 5 is a top plan view of the apparatus shown in FIG. 1.

A preferred embodiment of the present invention is shown in FIGS. 1 through 6. Mounted on table 12 is vertically disposed support column 14. Table 12 is provided with four legs 13 which have a length appropriate for ease of operation of the apparatus. Lower support bracket 16 is secured to the upper end of support column 14. Suspended from lower support bracket 16 by means of four screws 17 (see FIG. 5) is elongated guide means 18. An elongated, substantially cylindrical cutter 20 circumferentially surrounds guide means 18 in telescopic fashion so that cutter 20 remains in substantial alignment with guide means 18 as cutter 20 is moved downwardly. The lower end of cylindrical cutter 20 is provided with a toothed cutting edge 21 which facilitates cutting through the body of a pineapple. Downward movement of cylindrical cutter 20 is accomplished via a pair of diametrically opposed handles 24 and 26 which are affixed to the wall of cutter 20 by mounting plates 25 and 27, respectively. Cylindrical cutter 20 is also provided with knife blade 30 which is attached to the projects outwardly from the wall of cutter 20 immediately above toothed cutting edge 21 and is designed to slit the peel that is separated from the edible flesh of the pineapple by cutter 20. It is important that the maximum effective transverse dimension of guide means 18 be only slightly less than the effective inside diameter of cylindrical cutter 20 in order to minimize lateral displacement of cutter 20 as it is moved downwardly towards the cutter pad. Preferably, the maximum effective transverse dimension of guide means 18 should be at least 96 percent and preferably at least 98 percent of the effective inside diameter of cutter 20. The term "effective" as used in connection with the transverse dimension of guide means 18 and the inside diameter of cutter 20 is defined in the teachings which follow and particularly those teachings which relate to FIGS. 9a and 9b.

Lower support bracket 16 is provided with a mounting hole in which vertically oriented support mast 35 is installed. Attached to the upper end of support mast 35 is the upper support bracket 37 which is provided with a threaded hole adapted to receive spring tension adjusting screw 39 (see FIG. 4). Axially aligned with adjusting screw 39 is cylindrical core tube 42 which is positioned beneath upper support bracket 37. Guide means 18 is provided with a passageway extending the entire length thereof, said passageway being designed to accommodate core tube 42 in a slidable or telescopic manner. Lower support bracket 16 is also provided with an opening that is aligned with the passageway in guide means 18 and through which core tube 42 passes. Core tube 42 is provided with a pointed cutting tip 43 to facilitate penetration of the pineapple. In this preferred embodiment cylindrical cutter 20 and core tube 42 are provided with diametrically opposed holes that are capable of being aligned to permit insertion of connecting pin 45 (see FIGS. 3 and 4). Thus, connecting pin 45 causes core tube 42 to move in concert with cylindrical cutter 20 to effect simultaneous peeling and coring of a pineapple when downward force is applied to handles 24 and 26. Guide means 18 is provided with slot 22 (see FIG. 2) which extends transversely and longitudinally through guide means 18 in a manner such that connecting pin 45 is unimpeded throughout its normal limits of movement during operation of the apparatus. Cutter 20 and core tube 42 are held in their raised or normal rest position by core tube return spring 48 whose upper end is attached to adjusting screw 39. The lower end of spring 48 is attached to spring retaining hook 47 (see FIG. 6) which, in turn, is secured to the inside wall of core tube 42 a short distance above the holes through which connecting pin 45 passes. Spring length and tension are selected and adjusted to provide the elasticity necessary to return cutter 20 and core tube 42 to their rest position. During periods when the apparatus is not in use, the core tube 42 and attached cutter 20 may be locked in their raised position by means of locking collar 50 which is rotatably and eccentrically mounted on support mast 35. Rotation of locking collar 50 brings it into engagement with collar assembly 44 mounted on the upper end of core tube 42. It is preferred that the length of guide means 18 exceed the length of cylindrical cutter 20 slightly so that toothed cutting edge 21 does not protrude beyond the end of guide means 18 when cutter 20 is held in its raised position. This eliminates the potential hazard of an exposed toothed cutting edge to the user of the apparatus during placement and removal of a pineapple.

Disposed within core tube 42 is a core ejector rod 38 (see FIG. 6) whose upper end is firmly anchored in upper support bracket 37 and whose lower end is located adjacent to the pointed cutting tip of core tube 42 when core tube 42 is in its raised or rest position. The core ejector rod 38 forces the pineapple core from core tube 42 as the core tube is retracted to its rest position.

Table 12 is provided with an opening located directly below cylindrical cutter 20 and designed to receive juice dish 53. Juice dish 53 is provided with an opening comparable in size to that in table 12 and cutter pad 55 (see FIG. 6) is inserted into both the table and juice dish openings. Cutter pad 55 is provided with two annular grooves or channels concentrically arranged and designed to receive the cutting edges of cylindrical cutter 20 and core tube 42. Annular channel 56 is adapted to receive the toothed cutting edge of cutter 20 and is provided with drain hole 57 while annular channel 58 is adapted to receive the pointed cutting tip of core tube 42 and is provided with drain hole 59. Suspended below cutter pad 55 is juice container 61 which collects juice draining from the cutter pad via drain holes 57 and 59. Juice container 61 is held by mounting frame 62 which is attached to table 12 by hangers 63.

Shown in FIG. 7 is another embodiment of the present invention which allows cylindrical cutter 20 and core tube 42 to be operated separately. In this version lower support bracket 16 is provided with an opening large enough to permit cutter return spring 65 to pass freely through it. Cutter return spring 65 is connected to upper support bracket 37 via adjusting screw 66 and to mounting hook 68 attached to the upper end of cylindrical cutter 20. Core tube 42 is provided with a pair of removeable handles 70 and 71 (see FIG. 8) which permit a downward force to be applied to core tube 42 alone when connecting pin 45 is removed. Thus, either the cylindrical cutter 20 or core tube 42 can be operated individually as desired.

Figure 9A:
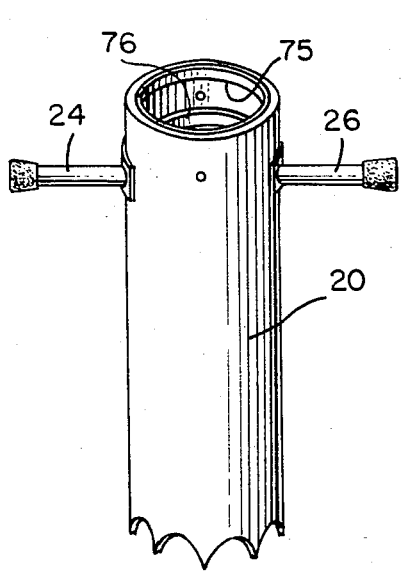
FIGS. 9a and 9b are perspective views of portions of the apparatus as modified in accordance with another embodiment of the invention.
Figure 9B:
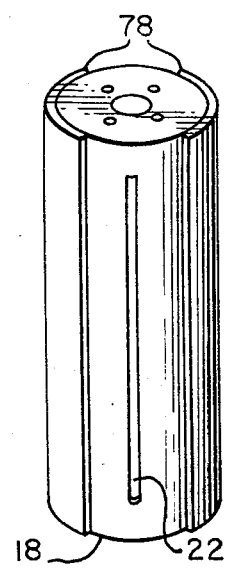

Since the size of mature pineapples may vary depending on cultivation conditions, varieties and other factors, it is desirable to employ a cylindrical cutter 20 which has a cutting diameter that is appropriate for the size of the pineapple that is to be cut. The present invention can be adapted to accommodate different sizes of pineapples by substituting cylindrical cutters having the desired cutting diameter. The transverse dimension of guide means 18 is selected to permit the use of the smallest diameter cylindrical cutter that is expected to be used. Cylindrical cutters of greater diameter can then be positioned on guide means 18 by employing suitable spacer elements between the inside wall of cutter 20 and the peripheral surface of guide means 18. One suitable arrangement is shown in FIG. 9a wherein annular spacer elements 75 and 76 are attached in spaced relationship to the inside wall of cylindrical cutter 20. The distance between spacer elements 75 and 76 is determined by the limits of travel of cutter 20 with respect to guide means 18 and should preferably be the maximum distance that will permit both elements to remain in contacting circumferential relationship with guide means 18 as cutter 20 is moved through its limits of travel. Alternatively, spacer elements may be installed on the peripheral surface of guide means 18 as shown in FIG. 9b. Thus, spacer strips 78 are longitudinally arranged and circumferentially spaced on the peripheral surface of guide means 18. Spacer strips 78 are provided with a plurality of projections on one side thereof for insertion into a similar plurality of holes formed in guide means 18 to permit spacer strips 78 to be detachably secured to guide means 18. At least two and preferably three or more spacer strips 78 should be secured to guide means 18 and spaced substantially equidistantly around the periphery of guide means 18 to provide proper guidance to cylindrical cutter 20. The width of spacer strips 78 must be somewhat greater when only two strips are employed but they can be relatively narrow when four or more strips are used. It is essential that spacer strips 78 be installed on the peripheral surface of guide means 18 so that they do not interfere with the movement of connecting pin 45 in slot 22. Regardless of the spacer element design employed or the manner in which it is disposed in the space between the peripheral surface of guide means 18 and the inside surface of cutter 20, it is important that the maximum effective transverse dimension of guide means 18 be at least 96 percent and preferably at least 98 percent of the effective inside diameter of cylindrical cutter 20. By the term "effective" is meant the dimension which includes a consideration of any spacer elements which may be employed in the space between the peripheral surface of guide means 18 and the inside surface of cutter 20. For example, the effective inside diameter of cylindrical cutter 20 shown in FIG. 9a would actually be the inside diameter of annular spacer elements 75 and 76 since spacer elements 75 and 76 make slidable contact with the surface of guide means 18 to guide cylindrical cutter 20 to cutter pad 55. Similarly, the maximum effective transverse dimension of the modified guide means shown in FIG. 9b would be the diameter of a circular plane whose circumference passes through the surface of each spacer strip 78 that is most remote from the periphery of guide means 18. It is also apparent that the peripheral surface of guide means 18 could be formed with a ribbed or undulated construction so that only the raised portions of that surface would be in sliding contact with cutter 20. The maximum effective transverse dimension of such a construction would in like manner be the diameter of a circular plane whose circumference passes through the raised points on the surface of guide means 18.

The materials used for constructing the disclosed apparatus are conventional and commercially available. In a preferred version, the table is fabricated from cast aluminum that is provided with a thermoplastic protective coating. The upper and lower support brackets 37 and 16 may also be fabricated from cast aluminum while the support column 14 and support mast 35 are preferably stainless steel. As a general rule, it is preferred that those parts of the apparatus which are directed contacted by the pineapple or juice from the pineapple be constructed from stainless steel or thermoplastic materials. In particular, guide means 18 and cutter pad 55 are preferably formed from high density polyethylene or ultra high molecular weight polyethylene. Thermoplastic materials such as low density polyethylene or polypropylene are suitable for use in forming juice dish 53, juice container 61 and locking collar 50. Other principal components of the apparatus such as core tube 42, cylindrical cutter 20, connecting pin 45, knife blade 30, core tube return spring 48, cutter return spring 65 and core ejector rod 38 are preferably fabricated from stainless steel.

With respect to the core tube and cylindrical cutter, 1.25-inch diameter stainless steel tubing having a wall thickness of 0.035 inch has been found to be satisfactory for use as the core tube. The pointed cutting tip of core tube 42 is formed by cutting two V-shaped portions from one end of the core tube. The apex of the "V" is located approximately 0.5 inch from the end of the tube. The two protruding tips at the end of the tube are then sharpened by grinding and the sharpened tip is case hardened using conventional and well-known techniques. The cylindrical cutter is conveniently fabricated from stainless steel sheet having a thickness of 0.065 inch and measuring 11×12 inches. One of the edges measuring 11 inches in length is cut to form a series of seven equally spaced teeth with the indentation between adjoining teeth being approximately 0.75 inch. The two edges measuring 12 inches in length are then joined by a welded seam using conventional methods. The cylindrical cutter that is formed has an inside diameter that measures approximately 3.5 inches. The teeth are sharpened by grinding and the sharpened teeth are hardened by heat treatment.

The apparatus of this invention is designed for use in fresh fruit markets and other locations where fresh pineapples are sold. Its simplicity of operation enables store employees and customers to use it without any previous training. Following selection of a pineapple for purchase, the cutter operator (e.g., the store's produce section manager) removes the top (i.e., the crown) and bottom of the pineapple by making appropriate transverse cuts at right angles to the longitudinal axis of the pineapple using a suitable knife or other cutting tool. The trimmed pineapple is then centered upright on the cutter pad 55, locking collar 50 is rotated to the unlocked position (if necessary), cylindrical cutter 20 (and core tube 42 if connecting pin 45 is installed) is moved downwardly through the pineapple to the cutter pad by grasping handles 24 and 26, and cutter 20 is allowed to retract to its raised position. As cutter 20 (and core tube 42 if connected) retracts, the trimmed pineapple and core are forced from the cutter and core tube by guide means 18 and core ejector rod 38 respectively. The pineapple peel usually adheres to the outer surface of cutter 20 but is easily removed therefrom for discard. Operation of the device with connecting pin 45 removed requires core tube 42 to be moved downwardly in a separate step by grasping handles 70 and 71. The severed core of the pineapple can be pushed from the surrounding pineapple flesh, if desired, prior to placing the edible flesh in a suitable container or package that is retained by the customer.

Although specific embodiments of the present invention have been described above, it is apparent that a number of variations in the apparatus can be made without departing from the spirit and scope of the appended claims. Such variations are deemed to be a part of this invention.

What is claimed is:
1. Apparatus for removing the peel from a pineapple comprising
   (a) an elongated, substantially cylindrical body provided with a toothed cutting edge on one end of said cylindrical body that is designed to cut through a pineapple,
   (b) elongated guide means telescopically positioned within said elongated, substantially cylindrical body and provided with a first support means for maintaining the guide means in a substantially fixed position,
   (c) a cutting pad positioned in opposing relationship to and spaced a sufficient distance from the toothed cutting edge of said elongated, substantially cylindrical body to permit a pineapple to be interposed between the cutting pad and the elongated, substantially cylindrical body,
   (d) means for moving said elongated, substantially cylindrical body towards said cutting pad with sufficient force to enable said toothed cutting edge to engage and to pass through a pineapple interposed between the cutting pad and the elongated, substantially cylindrical body.
2. The apparatus of claim 1 wherein the maximum effective transverse dimension of said elongated guide means is at least 96 percent of the effective inside diameter of said elongated, substantially cylindrical body.

3. The apparatus of claim 1 or 2 wherein said cutting pad is provided with an annular groove designed to receive the toothed cutting edge of said elongated, substantially cylindrical body.

4. The apparatus of claim 3 wherein the means for moving said elongated, substantially cylindrical body towards said cutting pad comprises a pair of handles projecting outwardly from the wall of said elongated, substantially cylindrical body.

5. The apparatus of claim 4 which additionally includes a knife blade affixed to and projecting outwardly from the wall of the elongated, substantially cylindrical body immediately above said toothed cutting edge, said knife blade being designed to slit the peel that is removed from the pineapple by said toothed cutting edge.

6. The apparatus of claim 4 which additionally includes resilient means attached to said elongated, substantially cylindrical body capable of applying sufficient force to the cylindrical body to move the cylindrical body away from said cutting pad when an opposing force applied to said pair of handles is discontinued.

7. The apparatus of claim 5 which additionally includes resilient means attached to said elongated, substantially cylindrical body capable of applying sufficient force to the cylindrical body to move the cylindrical body away from said cutting pad when an opposing force applied to said pair of handles is discontinued.

8. Apparatus for removing the peel and core from a pineapple comprising
(a) an elongated, substantially cylindrical body provided with a toothed cutting edge on one end of said cylindrical body that is designed to cut through a pineapple,
(b) elongated guide means telescopically positioned within said elongated, substantially cylindrical body and provided with a first support means for maintaining the guide means in a substantially fixed position, said elongated guide means being provided with a passageway extending therethrough along the longitudinal axis of the guide means and designed to accommodate a core tube slidably positioned in said passageway,
(c) a cutting pad positioned in opposing relationship to and spaced a sufficient distance from the toothed cutting edge of said elongated, substantially cylindrical body to permit a pineapple to be interposed between the cutting pad and the elongated, substantially cylindrical body,
(d) a substantially cylindrical core tube provided with a pointed cutting tip and having a length that is significantly greater than said substantially cylindrical body and said guide means, said substantially cylindrical core tube also being provided with means for resilient attachment to a second support means and being slidably disposed in the passageway extending through said elongated guide means so that said pointed cutting tip is positioned in opposing relationship to said cutting pad, and
(e) means for moving said elongated, substantially cylindrical body and said substantially cylindrical core tube towards said cutting pad with sufficient force to enable the toothed cutting edge associated with said cylindrical body and the pointed cutting tip associated with said core tube to engage and to pass through a pineapple interposed between the cutting pad and the elongated, substantially cylindrical body.

9. The apparatus of claim 8 wherein the maximum effective transverse dimension of said elongated guide means is at least 96 percent of the effective inside diameter of said elongated, substantially cylindrical body.

10. The apparatus of claim 8 or 9 which includes a core ejector rod disposed within said substantially cylindrical core tube and secured to said second support means.

11. The apparatus of claim 10 wherein said cutting pad is provided with concentrically arranged annular grooves designed to receive the toothed cutting edge associated with said elongated, substantially cylindrical body and the pointed cutting tip associated with said substantially cylindrical core tube, said annular grooves being provided with means for draining juice from the grooves.

12. The apparatus of claim 11 which additionally includes a knife blade affixed to and projecting outwardly from the wall of the elongated, substantially cylindrical body immediately above said toothed cutting edge, said knife blade being designed to slit the peel that is removed from the pineapple by said toothed cutting edge.

13. The apparatus of claim 12 wherein said means for moving said elongated substantially cylindrical body and said substantially cylindrical core tube towards said cutting pad comprises a pair of handles attached to and projecting outwardly from the wall of said elongated substantially cylindrical body and a connecting pin passing through the wall of said elongated, substantially cylindrical body and the wall of said substantially cylindrical core tube.

14. The apparatus of claim 13 wherein said means for resilient attachment of said substantially cylindrical core tube to said second support means comprises a tension spring positioned within said core tube that is capable of applying sufficient force to the substantially cylindrical core tube and the elongated, substantially cylindrical body connected thereto to move the core tube and cylindrical body away from said cutting pad when an opposing force applied to said pair of handles is discontinued.

15. The apparatus of claim 12 wherein said means for moving said elongated, substantially cylindrical body and said substantially cylindrical core tube towards said cutting pad comprises a first pair of handles attached to and projecting outwardly from the wall of said elongated, substantially cylindrical body and a second pair of handles attached to and projecting outwardly from the wall of said substantially cylindrical core tube.

16. The apparatus of claim 15 which additionally includes a tension spring that connects said elongated, substantially cylindrical body to said second support means, said tension spring being capable of applying sufficient force to the elongated, substantially cylindrical body to move said body away from said cutting pad when an opposing force applied to said first pair of handles is discontinued.

17. The apparatus of claim 15 wherein said means for resilient attachment of said substantially cylindrical core tube to said second support means comprises a tension spring positioned within said core tube that is capable of applying sufficient force to the core tube to move the core tube away from said cutting pad when an opposing force applied to said second pair of handles is discontinued.

18. The apparatus of claim 12 which additionally includes locking means associated with said second support means and capable of being moved into engagement with said substantially cylindrical core tube to maintain the core tube in a substantially fixed position.

19. The apparatus of claim 12 which additionally includes container means associated with said cutting pad for collecting juice draining from said annular grooves in said cutting pad.

* * * * *